(12) United States Patent
Booth et al.

(10) Patent No.: US 9,404,605 B2
(45) Date of Patent: Aug. 2, 2016

(54) CABLE GUIDANCE SYSTEM

(71) Applicant: Ellis Patents Holdings Limited, Malton, North Yorkshire (GB)

(72) Inventors: Andrew Booth, Pickering (GB); Richard Armitage Shaw, Leeds (GB)

(73) Assignee: Ellis Patents Holdings Limited, Malton, North Yorkshire (GB)

( * ) Notice: Subject to any disclaimer, the term of this patent is extended or adjusted under 35 U.S.C. 154(b) by 8 days.

(21) Appl. No.: 14/285,104

(22) Filed: May 22, 2014

(65) Prior Publication Data

US 2014/0346291 A1    Nov. 27, 2014

(30) Foreign Application Priority Data

May 22, 2013   (GB) .................................. 1309223.4

(51) Int. Cl.
  *F16L 3/10*       (2006.01)
  *H02G 7/05*       (2006.01)
  *H02G 3/32*       (2006.01)

(52) U.S. Cl.
  CPC ............. *F16L 3/1091* (2013.01); *F16L 3/1016* (2013.01); *H02G 3/32* (2013.01); *H02G 7/053* (2013.01)

(58) Field of Classification Search
  CPC ..... F16L 3/1091; F16L 59/123; H02G 7/053; H02G 3/32; B65H 49/325; B65H 57/14
  See application file for complete search history.

(56) References Cited

U.S. PATENT DOCUMENTS

| | | | | |
|---|---|---|---|---|
| 1,930,878 A | * | 10/1933 | Jester .............................. | 248/64 |
| 3,135,398 A | * | 6/1964 | Larsen .......................... | 414/590 |
| 3,383,459 A | * | 5/1968 | Short ............................. | 174/144 |
| 3,547,386 A | * | 12/1970 | Clarke et al. .................... | 248/63 |
| 3,602,956 A | * | 9/1971 | Eddens et al. ............... | 24/115 R |
| 4,213,596 A | * | 7/1980 | Inoue et al. ............ | 254/134.3 R |
| 4,530,478 A | * | 7/1985 | McClellan ....................... | 248/62 |
| 4,568,794 A | * | 2/1986 | Kumamoto et al. ........ | 174/40 R |

(Continued)

FOREIGN PATENT DOCUMENTS

| | | |
|---|---|---|
| CN | 201490666 U | 5/2010 |
| DE | 2741880 A1 | 4/1978 |

(Continued)

OTHER PUBLICATIONS

European Patent Office, "Search Report," issued in connection with European application serial No. 14169500.7, issued Jul. 4, 2014, 5 pages.

Intellectual Proprty Office of Great Britain, "Search Report," issued in connection with GB Application No. 1309223.4, issued Nov. 13, 2013, 2 pages.

*Primary Examiner* — Bradley Duckworth

(74) *Attorney, Agent, or Firm* — Banner & Witcoff, Ltd.

(57) ABSTRACT

A cable guide or cleat for a cable, comprises, in one embodiment, a pivot mounting, a base section on the mounting and an upper section that, when fastened to the base section, a cylindrical guide with clearance for a cable to be passed through the guide for installation, and an insert piece designed to be inserted when the cable is in its final position, so that the base and upper sections, clamp the cable in place. The clearance allows the cable guide to be used first without the insert, when laying the cable, facilitating the laying of the cable round bends in particular. Then, when the cable is in place, the cleat is released again and the insert put in place, so that when the cleat is fastened the cable is securely clamped. Disclosed systems obviate the need for separate temporary guides that would otherwise need storing.

17 Claims, 5 Drawing Sheets

(56) References Cited

U.S. PATENT DOCUMENTS

| | | | |
|---|---|---|---|
| 6,109,561 A | | 8/2000 | Haines |
| 6,135,398 A | * | 10/2000 | Quesnel .................. 248/74.1 |
| 6,198,042 B1 | * | 3/2001 | Huston .................... 174/40 R |
| 6,595,472 B1 | * | 7/2003 | Pisczak .................... 248/74.1 |
| 6,721,483 B2 | * | 4/2004 | Grubish et al. ............ 385/135 |
| 6,892,990 B2 | * | 5/2005 | Pisczak .................... 248/74.4 |
| 7,213,790 B2 | * | 5/2007 | Bailey et al. ................ 248/65 |
| 7,368,660 B2 | * | 5/2008 | Hardy ..................... 174/40 R |
| 7,861,983 B2 | * | 1/2011 | Lange et al. .............. 248/74.4 |
| 8,398,033 B2 | * | 3/2013 | Booth ........................ 248/63 |
| 8,500,073 B2 | * | 8/2013 | Quesnel .................. 248/74.4 |
| 2002/0060274 A1 | * | 5/2002 | Klezath ....................... 248/58 |
| 2003/0183733 A1 | * | 10/2003 | Pisczak .................... 248/74.1 |
| 2014/0014775 A1 | * | 1/2014 | Luthi et al. ................ 244/129.1 |
| 2014/0216808 A1 | * | 8/2014 | Ahlisch et al. ........... 174/40 CC |
| 2014/0231598 A1 | * | 8/2014 | Miller et al. .................. 248/63 |

FOREIGN PATENT DOCUMENTS

| | | |
|---|---|---|
| EP | 1973211 A1 | 9/2008 |
| FR | 2569912 A2 | 3/1986 |
| GB | 1180732 A | 2/1970 |
| WO | 9932916 A1 | 7/1999 |
| WO | 03085308 A1 | 10/2003 |

* cited by examiner

CABLE GUIDANCE SYSTEM

CROSS-REFERENCE TO RELATED APPLICATIONS

The present application claims priority to GB 1309223.4, filed on 22 May 2013, which is hereby incorporated by reference in its entirety for any and all purposes.

BACKGROUND

The invention relates to a system for guiding cable, including, for example, heavy-duty, high-voltage cable, round a bend.

U.S. Pat. No. 6,109,561 (Haines Cable Systems) shows a system for guiding bundles of cables using rollers, and may be referred to for background.

When installing cable in a plant, in particular in a generating station such as an offshore wind-power station, cables have to be laid connecting the output to the distribution network. Laying such cables in a straight line is not difficult, and for this purpose clamps such as those set out in the applicant's EP 1973211 A1 can be used in certain implementations. Cable is unwound from a drum and advanced using a suitable drawing machine, and laid on the individual cleats. The cleats can have a roller at each end, so that the cable can run on these rollers, held in by hoops around the cable, until it is in its final position, whereupon the rollers are removed and the cable drops into the cleat. The cable can then be clamped in position in the usual way.

For guiding the cable round a bend, however, additional problems arise. Such bends arise for instance where the cable has to drop down or rise up a level in the plant or rig. High-voltage cables typically have a diameter of the order of 100-160 mm, and can be bent round a curvature or radius of approximately 3 m. This makes it difficult, if not impossible, to insert the end of the cable through both roller hoops on a typical cleat, because the curvature is too great. One way of guiding the cable round a bend therefore has involved installing bespoke roller guides fastened to the structure, and then removing them when the cable is in place and installing bespoke cleats to hold the cable in the bend region. This is obviously inconvenient in itself, and moreover the rollers have to be stored somewhere once they have been used.

SUMMARY

In aspects of the invention, one or more oversize clamps or cleats are used to guide the cable, the cleats having an upper or closure part which first moved into the closed configuration to act as a guide and then, once the cable is in place, the closure part of each cleat is opened, an insert of suitable dimensions is inserted, and the cleat is closed again to clamp the cable by way of the insert.

In another aspect of the invention, an apparatus may include one or more closable cleats, each having a closure member and an insert designed to clamp a cable substantially smaller in diameter than the bare cleat, in order to guide the cable while it is being advanced into position and, with the insert in place, to clamp the cable when it is in its final position. In many applications, several such cables may be laid in parallel, with a spacing of perhaps 200 mm from each other.

In certain embodiments, the insert reduces the internal diameter of the cleat by at least 10%, probably about 20-30%. For instance, for a cable of diameter 117 mm, the interior diameter of the cleat could be about 150 mm.

The length (i.e. along the cable direction) of the cleat might be about 200 mm, whereas a typical "straight-line" cleat might be 600 mm long. The cleat may be mounted on a pivot mount with two degrees of freedom, which one might describe as pitch and yaw, to allow it to conform to the cable. The system allows accurate positioning of the cable.

BRIEF DESCRIPTION OF DRAWINGS

For a better understanding of the invention, embodiments of it will now be described, by way of example, with reference to the accompanying drawings, in which.

DETAILED DESCRIPTION

Figure 1:
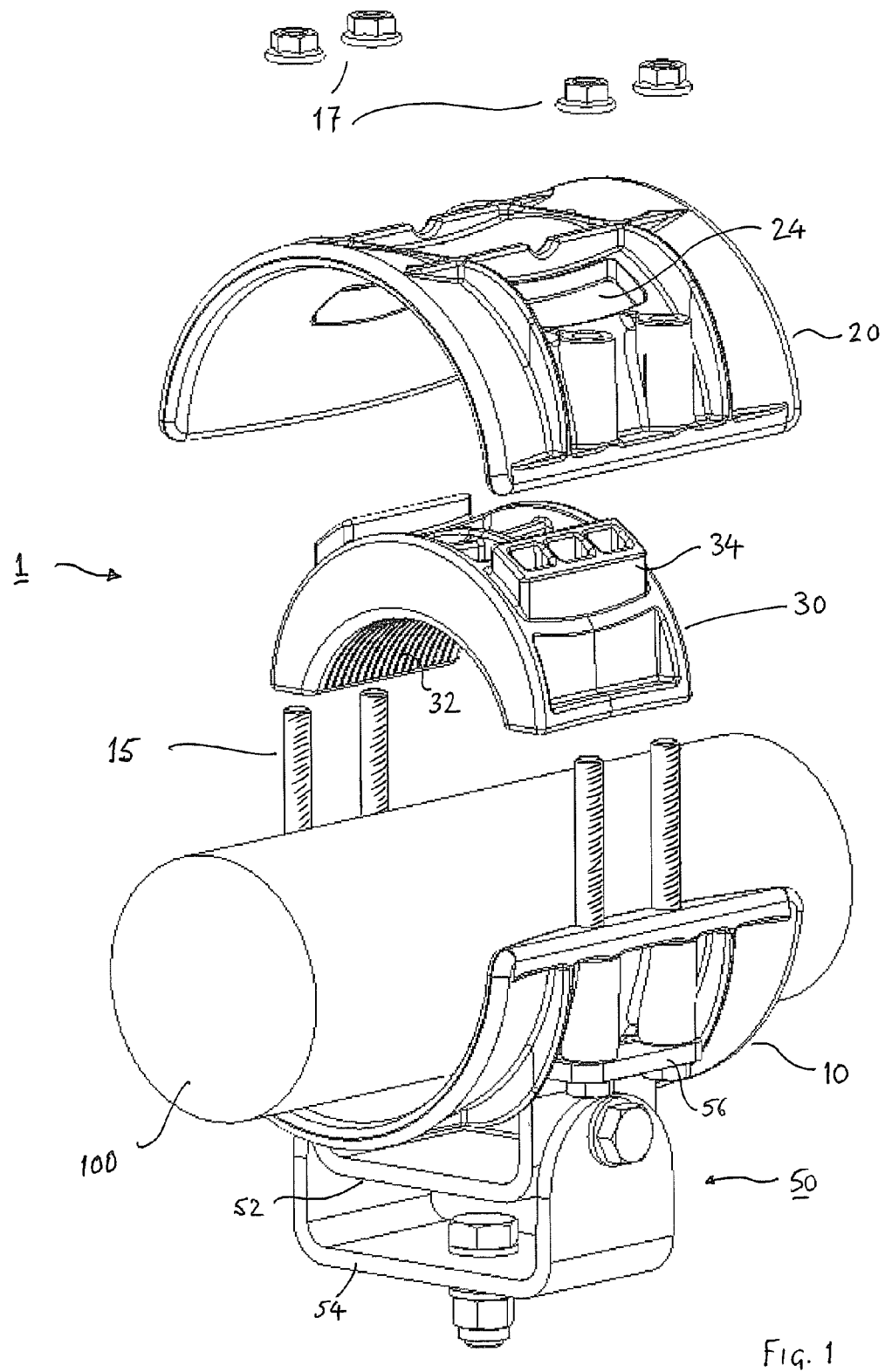
FIG. 1 shows an exploded view of an example cleat and insert, with a section of cable passing through it.
Figure 2:
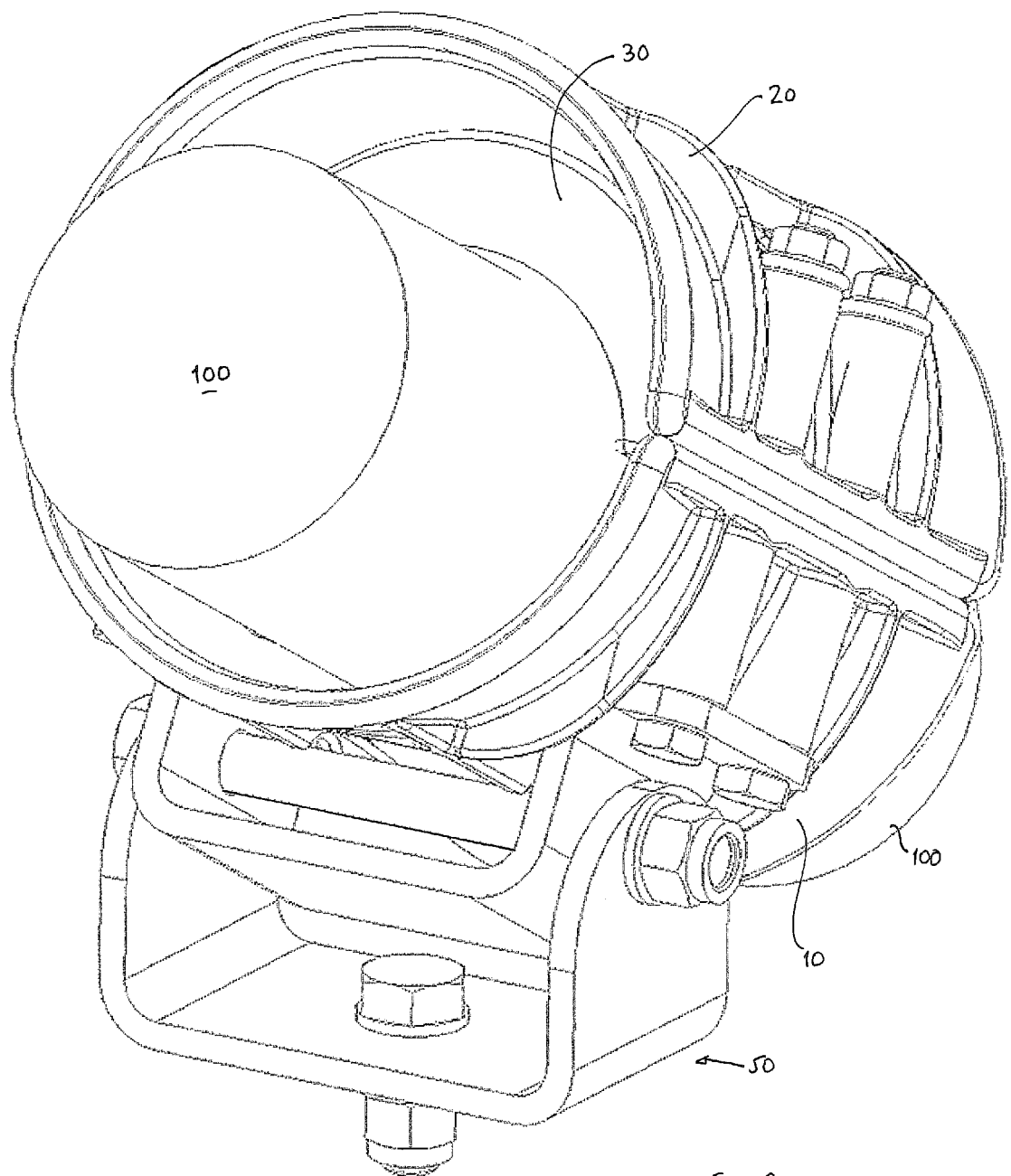
FIG. 2 shows an example cleat and insert, which may be the same cleat and insert shown in FIG. 1, in an assembled state.
Figure 3:
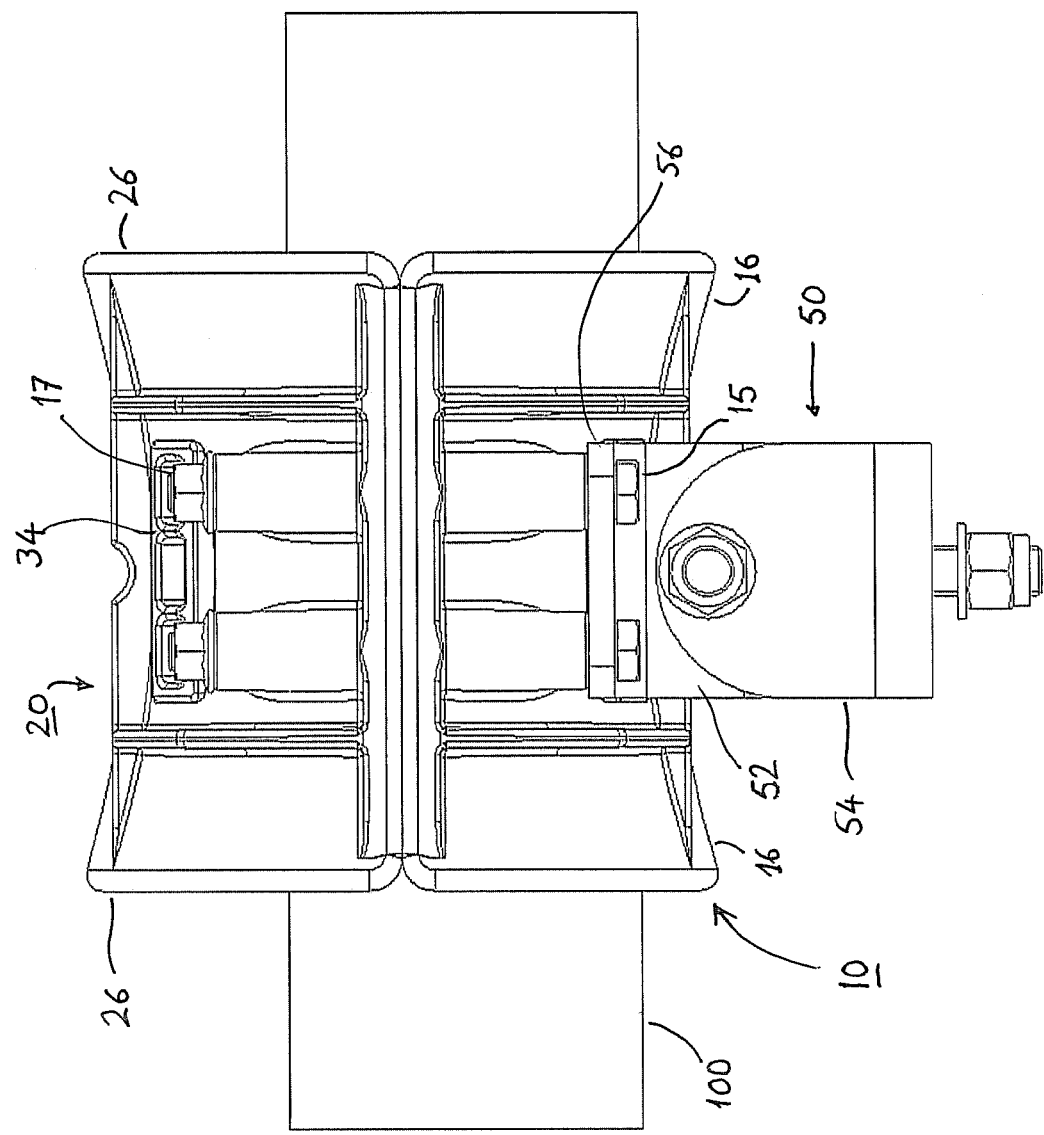
FIG. 3 is a side view of an example cleat and insert.

In FIG. 1 the components of a guide cleat in accordance with an example embodiment are shown. A base section, generally shown as constructed as a moulding 10 (and as such, alternatively referred to herein as base moulding 10), supports a cable 100, which may be capable of carrying a high voltage, and/or having a diameter in the range 100-160 mm. As would be known to a person of ordinary skill in the art, no details of the cable are shown, and it can be of any known type. The base moulding 10 can be of hard, temperature-resistant plastics, or of aluminium, steel or other suitable material. It is generally hollow-hemicylindrical in shape, fitting the cable, with the axis along the cable, though it has circumferential reinforcing flanges. It also flares outwardly slightly, at least at the forward end and, in certain implementations, at both ends 16, as best shown in FIG. 3, in order to avoid presenting an edge to the cable. The central section is cylindrical A corresponding top moulding 20, which may be of similar material and/or shape, may be configured to be fastened to the base moulding by a suitable fastening mechanism(s), including but not limited to the illustrated four vertical bolts 15 and nuts 17, so as to act as a closure member. Clearly other ways of fastening the two cleat parts together are possible, with different numbers of bolts, with a hinge, and so forth. The bolts pass through cylindrical bushings in the two mouldings, where they are held by the nuts 17 at the top, the heads retained on a platform 56 in a pivot mounting arrangement 50 on which the base moulding rests. The pivot mount has a first bracket 52 rotating about a transverse horizontal axis, itself mounted in a bottom bracket 54, which can rotate about a vertical axis. A pivoted configuration is shown in FIG. 2. Terms such as "vertical" are used for convenience, by reference to the drawing, since the cable's course could extend in any direction and/or direction(s), such as along multiple axes. The mounting is shown to be positioned underneath the cable, however, may be positioned in other orientations.

In certain embodiments, the cleat may be configured such that during use, it forms an interior diameter that is at least 10% larger than the diameter of the cable to be held or being held. In one embodiment, the internal diameter may be at least 20% larger than the diameter of the cable to be held or being held. In yet another embodiment, internal diameter of the cleat may be between 10-30% larger than the diameter of the cable to be held or being held. In one embodiment, the cleat may have an internal diameter of about 150 mm, which may be about 10-30% larger than the diameter of the cable. In certain implementations, this configuration allows the cable to be passed through the closed cleat without significant impediment during the laying process. Hence, for final clamping, an insert 30 is present, which takes up at least a portion of the space between cable and cleat. The insert 30, which may be made of somewhat softer material than the base and closure sections (e.g., base moulding 10 and top moulding 20), usually a plastics material, may be somewhat less than hemicylindrical in circumferential extent, and shorter in axial extent than the mouldings. As shown in FIG. 1, the insert 30 corresponds to the central, cylindrical, section of the mouldings. It is shown with internal circumferential ribs 32 for gripping the cable. In order to provide an anchor, it may also have rectangular bosses 34 protruding outwardly, fitting into corresponding rectangular apertures 24 in the top moulding 20. Although two bosses 34 are shown, clearly there could be more or fewer bosses and they need not be rectangular. FIG. 2 shows the assembly with the cable clamped, held between the insert 30 and the base moulding 10.

Figure 4:
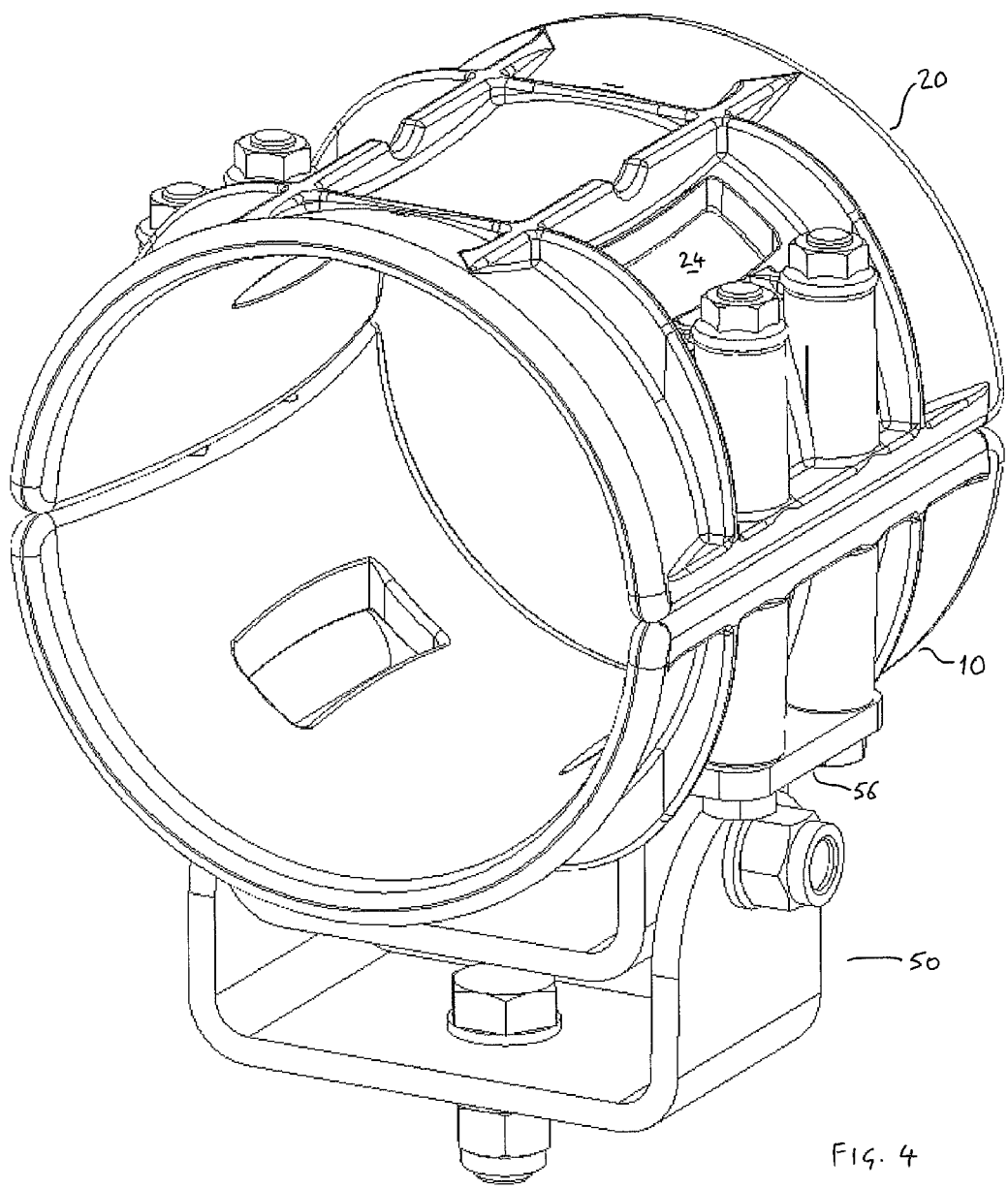
FIG. 4 shows an example cleat without an insert, as it may be used in one embodiment form a cable guide.

An example use of the system is as follows. The course of a cable, or set of cables, is laid out, and supports or cable guides in the form of cleats are fixed to the structure, such as an offshore wind farm, at suitable intervals, such as about 3 m. For the straight runs, cleats such as the ("Centaur" cleat, commercially available from Ellis Patents Limited, North Yorkshire, United Kingdom, may be utilized. In certain embodiments, cleats described in EP 1973211, which is incorporated by reference in its entirety for any and all non-limiting purposes, may be used. Any of the above-referenced cleats can be used, such as with rollers temporarily fitted at the ends slightly higher than the surface of the cleat, so that the cable can be pushed and/or pulled over the run without excessive friction. Where the cable has to turn a corner, it is not generally possible to use such rollers, because the bend will be too tight to pass the cable under the hoops that are associated with the rollers to keep the cable in position. Hence, instead, cleats as described herein are used for the bend sections of the run. Unlike prior-known cleats, one or more of the cleats as described herein may be used in their closed configuration, but without the inserts, as shown in FIG. 4. This allows several centimeters of clearance, enough not only for the cable but also for any end sheath that may be applied to enable the operator to pull the leading end of the cable.

The cable may then be pulled and/or pushed through the run, being fed off a drum, until the entire length is laid. The flanges at the axial ends of the cylindrical mouldings 10, 20 may be configured to ease the insertion of the cable into them, and its passage through them, and the contact with the mouldings, in particular the upper moulding, is over a substantial area, so that rollers at the curved section may not be needed.

Once a run is finished, the "straight" clamps or cleats may be closed, such as after removing the rollers, while in the curved sections the closed cleats/guides are re-opened, and the spacing inserts 30 are inserted and the top mouldings 20 are re-applied, clamping the cable. Everything can remain in place, so no storage problems are generated.

Figure 5:
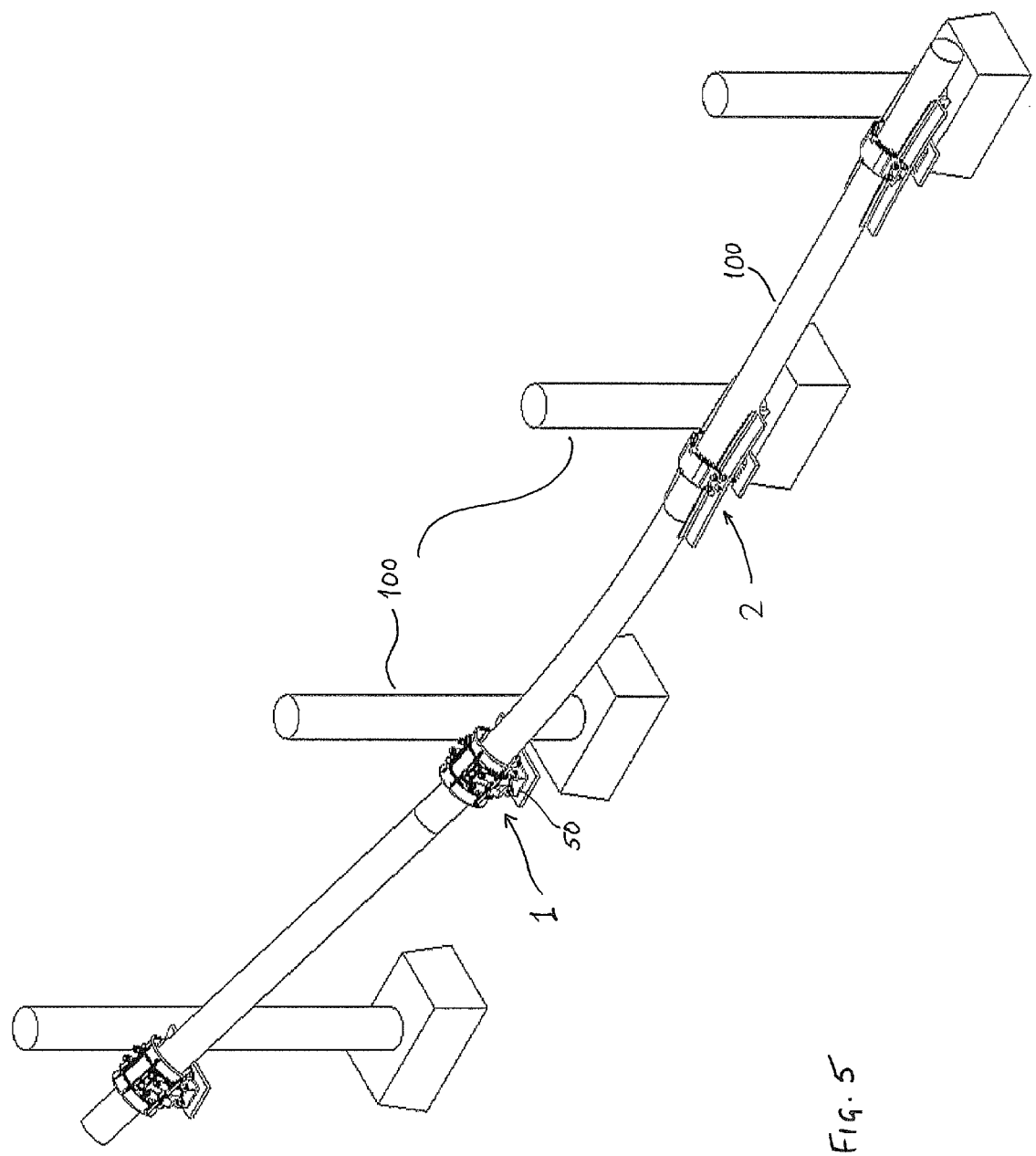
FIG. 5 shows an example installation using novel cleats in accordance with one embodiment in addition to "straight" cleats.

Part of a typical installation is shown in FIG. 5. The cable 100 runs horizontally at the right-hand side of the picture and must then cure upwardly as it towards the left. Thus the first two supports attached to uprights 110 are conventional "straight" cleats 2, as shown, for example, in EP 1973211, which is incorporated herein by reference in its entirely for any and all non-limited purposes. Once an appreciable curvature is needed, cleats 1 in accordance with the present invention are used, the cable being fed through them in their closed state, but without the inserts 30. When the cable is in place all the cleats are closed, and in the case of the straight cleat the hoops (not shown) are removed.

The invention has particular application to high-voltage cable of limited flexibility, but can be used for any cables or even for other continuous elongate components such as pipes. Moreover, although the system is designed for bend sections, it could also be used for straight ones.

What is claimed is:

1. A cable guide, comprising:
a mounting;
a base section configured to be positioned on the mounting;
an upper section designed to form, when fastened to the base section, a cylindrical guide having an inner diameter along a first axis with clearance for a cable to be passed through the guide's inner diameter for installation along the first axis; and
an insert configured to be inserted between the upper section and a cable when the cable is positioned in a final position on the guide with respect to the inner diameter, so that the cable directly contacts the insert and the base section, and the base and upper sections operatively clamp the cable in the final position between the base section and the insert.

2. A cable guide according to claim 1, wherein the base section comprises a first axial end and a second axial end that is opposite the first axial end with respect to the first axis to provide an axial length and the upper section comprises a first axial end and a second axial end that is opposite the first axial end with respect to the first axis to provide an axial length of the upper section, and
wherein the first axial end and the second axial end of the base and upper sections are each flared outwardly along a second axis that is transverse to the first axis to form a flare configured to aid cable guidance, whereby the base section and upper section each have a non-flared central portion and a flared portion located at the axial ends.

3. A cable guide according to claim 2, wherein the insert has an axial length that is the same length along the first axis as the central, non-flared portion of each of the base and upper sections.

4. A cable guide according to claim 1, wherein the base and upper sections have the same axial length.

5. A cable guide according to claim 1, wherein the mounting on which the base section is held comprises a pivot mounting arrangement configured to allow the cable guide to adapt to the course of the cable.

6. A cable guide according to claim 5, wherein the pivot mounting arrangement is configured to allow movement in both a pitch direction and a yaw direction, relative to the first axis.

7. A cable guide according to claim 1, wherein the insert comprises at least one protrusion and the upper section comprises a corresponding aperture configured to receive the at least one protrusion such that, when the cable guide is closed, the insert is fixed in position both axially and circumferentially with respect to the upper section.

8. A cable guide according to claim 1, wherein the insert is adapted to reduce the inner diameter of the cylindrical guide by at least around 10%-30%.

9. A cable guide according to claim 1, wherein the insert is less than hemicylindrical in circumferential extent.

10. A system for mounting a cable, comprising
at least one first cable guide configured to be placed at a curved portion of a cable run, having:

a mounting;

a base section configured to be positioned on the mounting, and comprising a first axial end and a second axial end opposite the first axial end with respect to a first axis to provide an axial length along the base section;

an upper section comprising a first axial end and a second axial end opposite the first axial end with respect to the first axis to provide an axial length along the upper section, wherein the base section and upper section are configured such that upon being fastened to each other a cylindrical guide is formed;

the cylindrical guide having an inner diameter along the first axis configured to provide clearance for a cable to be passed through the guide's inner diameter for installation; and an insert configured to be inserted between the upper section and a cable when the cable is positioned in a final position on the guide with respect to the inner diameter, so that the cable directly contacts the insert and the base section, and the base and upper sections operatively clamp the cable in the final position between the base section and the insert; and at least one second cable guide configured to be placed at a straight section of the cable run for guiding the cable into a position.

11. A system according to claim 10, in which the second cable guide comprises an internal diameter along the first axis configured to receive the cable, and wherein the internal diameter of the second cable guide is the same as the first cable guide with the insert fitted in the first cable guide.

12. A method for installing a cable, comprising:

positioning cleats along a desired course of the cable at intervals;

closing at least a portion of the clears such as to provide a clearance for the cleat with respect to the cable, so as to act, in their closed configuration, as guides while the cable is transported along the desired course;

transporting the cable along the desired course into a final position;

opening at least a portion of the closed cleats when the cable is in the final position, the portion of cleats each having an upper section and a base section;

inserting an insert between the upper section and the cable of at least a portion of the opening cleats so as to close the clearance between the upper section and the cable; and closing the cleats having an insert to clamp the cable in the final position between the base section and the insert such that the cable directly contacts the insert and the base section.

13. The method according to claim 12, in which the cleats with clearance are located along curved sections of the course.

14. The method according to claim 12, wherein the base section comprises a first axial end and a second axial end that is opposite the first axial end with respect to a first axis to provide an axial length; and the upper section having a first axial end and a second axial end that is opposite the first axial end with respect to the first axis to provide an axial length of the upper section.

15. The method of claim 14, wherein the first axial end and the second axial end of the base and upper sections are each flared outwardly along a second axis that is transverse to the first axis to form a flare configured to aid cable guidance, whereby the base section and upper section each have a non-flared central portion and a flared portion located at the axial ends.

16. The method according to claim 14, wherein the insert has an axial length that is the same length along the first axis as the central, non-flared portion of each of the base and upper sections.

17. The method according to claim 14, wherein the base and upper sections have the same axial length.

\* \* \* \* \*